United States Patent Office 2,793,984
Patented May 28, 1957

2,793,984

PREPARATION AND USE OF DESULPHURISATION CATALYSTS

Roy Purdy Northcott and Ernest Carlton Housam, Sunbury-on-Thames, England, assignors to The British Petroleum Company Limited, London, England, a British joint stock corporation No Drawing. Application February 28, 1956,
Serial No. 568,156

Claims priority, application Great Britain March 10, 1955

7 Claims. (Cl. 196—28)

This invention relates to the preparation of catalysts for use in the hydrocatalytic desulphurisation of petroleum hydrocarbons and to the operation of hydrocatalytic desulphurisation processes using such catalysts.

The use of so-called cobalt molybdate catalysts in the hydrocatalytic desulphurisation process is well-known, said catalysts consisting of the oxides of cobalt and molybdenum either as such or in combined form incorporated with a metal oxide support, consisting essentially of alumina. The use of such catalysts in the autofining process is also well-known as disclosed inter alia in United States Patents Nos. 2,573,726, 2,574,445–51 and 2,640,802. It is disclosed in the copending United States application No. 311,429, filed September 25, 1952, that the degree of desulphurisation effected in the autofining process is considerably increased by the introduction of a small amount, preferably between 0.1% and 6.0% by weight, of fluorine into the catalyst. It is thought that the increased desulphurisation may be attributed to an increase in the dehydrogenating activity of the catalyst, since the improvement is only apparent when operating under the equilibrium pressure method described in United States Patent No. 2,648,623. The use of fluorine-promoted cobalt molybdate catalysts, however, gives rise to the problem that the fluorine is progressively lost during the regeneration of the catalyst between processing periods, although it has been found that the fluorine content of the catalyst may be restored by the addition during the processing period of a suitable fluorine compound that will react with the catalyst to introduce fluorine thereinto. The compounds that have been suggested for use in this way are anhydrous hydrogen fluoride, tertiary butyl fluoride and dichlorodifluoromethane. These compounds may also be used to produce the initial fluorine-promoted cobalt molybdate catalyst, and for maintaining the fluorine content of a fluorine-promoted cobalt molybdate catalyst.

According to the present invention, fluorine is introduced into a cobalt molybdate catalyst as hereinbefore defined by reacting the catalyst with benzotrifluoride at a temperature above the boiling point of the benzotrifluoride. The reaction is preferably effected at a temperature above 500° F.

The process of the invention may be used to prepare a fluorine-promoted catalyst from a cobalt molybdate catalyst that contains no fluorine, or to maintain the fluorine content of a fluorine-promoted catalyst within desired limits, for example, within the range of 0.1% to 6.0% by weight as required in the autofining process. In the latter case, the necessary quantity of benzotrifluoride may conveniently be added to the liquid feedstock before it is vapourised and passed to the autofining zone.

Benzotrifluoride ($C_6H_5CF_3$) has the advantages that it is a very stable liquid having a boiling point of about 102° C., it is more stable than tertiary butyl fluoride, less corrosive and easier to handle than hydrogen fluoride, and does not contain other potentially corrosive halogens as in the case of dichlorodifluoromethane.

The invention will now be described with reference to the following examples:

Example 1

This example illustrates the use of benzotrifluoride for preparing a fluorine-promoted cobalt molybdate catalyst.

A catalyst was prepared using as a base a cobalt molybdate catalyst containing molybdenum and cobalt in amounts of 15.6 percent weight and 2.9 percent weight respectively expressed as $MoO_3$ and $CoO$.

495 g. of this catalyst base, occupying a volume of 545 ml. were charged to a reactor and an autofining run of 35 hours duration carried out under the following conditions:

Temperature _____ 780° F.
Pressure _____ Equilibrium, starting at 100 p. s. i. ga.
Space velocity ____ 2.0 v./v./hr.
Recycle rate _____ 2000 S. C. F./B. set at 100 p. s. i. ga.

The feedstock in this run was a Kuwait gas oil of 0.8435 specific gravity, 248 to 359° C. A. S. T. M. distillation range and 1.30 percent weight sulphur content, in which had been dissolved 36 g. of benzotrifluoride.

On completion of the run, the catalyst was regenerated with a mixture of air and nitrogen, and mixed. The catalyst prepared in this way contained 2.2 percent wt. fluorine. It was recharged and a further run of 200 hours duration carried out under the same conditions as above but on a gas oil feedstock containing no dissolved benzotrifluoride. The results obtained are compared below with those obtained under the same conditions using a catalyst containing no fluorine.

| | Organic sulphur content percent wt. of liquid product at— | | | | | | | | |
|---|---|---|---|---|---|---|---|---|---|
| | 10 hr. | 25 hr. | 50 hr. | 75 hr. | 100 hr. | 125 hr. | 150 hr. | 175 hr. | 200 hr. |
| Catalyst without fluorine | 0.18 | 0.33 | 0.46 | 0.56 | 0.61 | 0.64 | 0.68 | 0.72 | 0.75 |
| Catalyst with fluorine as prepared above | | 0.04 | 0.04 | 0.11 | 0.11 | 0.20 | 0.28 | 0.34 | 0.40 |

Example 2

This example illustrates the use of benzotrifluoride for maintaining the activity of a fluorine-promoted cobalt molybdate catalyst.

A catalyst was prepared by the addition of cobalt and molybdenum compounds, together with aluminum fluoride to a wet alumina gel which was dried and subsequently roasted at 550° C. for 2 hours.

This catalyst, which contained 2.8 percent wt. fluorine, was then used for autofining a Kuwait gas oil of 1.30 percent wt. sulphur content under the following conditions:

Temperature _____ 780° F.
Pressure _____ Equilibrium starting at 100 p. s. i. ga.
Recycle rate _____ 2000 S. C. F./B. set at 100 p. s. i. ga.
Space velocity ____ 2.0 v./v./hr.

The sulphur contents of the product are given in the table below. The catalyst was regenerated with a mixture of nitrogen and air. Further runs, with regenerations between each run were then carried out under the same conditions as above, except that 0.006 percent wt. of benzotrifluoride was added to the feedstock for the first 50 hours of each run. The results obtained were as follows:

| No. of regenerations | Organic sulphur content percent wt. of liquid product at— | | | | | | | | |
|---|---|---|---|---|---|---|---|---|---|
| | 10 hr. | 25 hr. | 50 hr. | 75 hr. | 100 hr. | 125 hr. | 150 hr. | 175 hr. | 200 hr. |
| Nil | 0.02 | 0.04 | 0.04 | 0.09 | 0.11 | 0.19 | 0.27 | 0.34 | 0.38 |
| 1 | 0.03 | 0.04 | 0.04 | 0.08 | 0.10 | | | | |
| 2 | 0.04 | 0.05 | 0.05 | | | | | | |
| 3 | 0.02 | 0.02 | 0.03 | 0.08 | 0.11 | | | | |
| 4 | 0.05 | 0.04 | 0.05 | 0.07 | 0.11 | 0.18 | 0.28 | 0.35 | 0.39 |
| 5 | 0.03 | 0.04 | 0.04 | | | | | | |
| 6 | 0.06 | 0.07 | 0.06 | | | | | | |
| 7 | 0.02 | 0.03 | 0.04 | | | | | | |
| 8 | 0.04 | 0.04 | 0.06 | 0.08 | 0.12 | | | | |
| 9 | 0.03 | 0.04 | 0.04 | 0.08 | 0.10 | 0.17 | 0.25 | 0.33 | 0.37 |

We claim:

1. A method of introducing fluorine into a cobalt molybdate catalyst as herein defined, which comprises reacting the catalyst with benzotrifluoride at a temperature above the boiling point of the benzotrifluoride.

2. A method according to claim 1, which is carried out at a temperature above 500° F.

3. A method of maintaining the fluorine content of a fluorine-promoted cobalt molybdate catalyst as herein defined, which comprises reacting the catalyst with benzotrifluoride at a temperature above the boiling point of the benzotrifluoride.

4. A method according to claim 3, which is carried out at a temperature above 500° F.

5. In the desulphurisation of petroleum hydrocarbons by means of the autofining process using a fluorine-promoted cobalt molybdate catalyst as herein defined, the improvement which comprises maintaining the fluorine content of the catalyst by reacting the catalyst during the process with benzotrifluoride introduced as vapour into the autofining zone.

6. An autofining process according to claim 5, wherein the fluorine content of the catalyst is maintained within the range 0.1% to 6.0% by weight.

7. An autofining process according to claim 5, wherein the benzotrifluoride is added to the liquid feedstock.

No references cited.